(12) United States Patent
Engel et al.

(10) Patent No.: US 6,522,509 B1
(45) Date of Patent: Feb. 18, 2003

(54) ARC FAULT DETECTION IN AC ELECTRIC POWER SYSTEMS

(75) Inventors: Joseph Charles Engel, Monroeville, PA (US); Kevin Lynn Parker, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 285 days.

(21) Appl. No.: 09/621,253

(22) Filed: Jul. 21, 2000

(51) Int. Cl.[7] .............................. H02H 9/08; H02H 3/00
(52) U.S. Cl. .............................. 361/42; 361/78; 361/94
(58) Field of Search .............................. 361/42, 76, 78, 361/94, 87

(56) References Cited

U.S. PATENT DOCUMENTS

| | | |
|---|---|---|
| 5,107,237 A | 4/1992 | Peterson |
| 5,224,006 A | 6/1993 | MacKenzie et al. |
| 5,280,404 A | 1/1994 | Ragsdale |
| 5,519,561 A | 5/1996 | Mrenna et al. |
| 5,602,709 A * | 2/1997 | Al-Dabbagh ................ 324/520 |
| 5,682,101 A | 10/1997 | Brooks et al. |
| 5,691,869 A | 11/1997 | Engel et al. |
| 5,933,305 A | 8/1999 | Schmalz et al. |
| 6,031,699 A * | 2/2000 | Dollar et al. ................ 361/42 |
| 6,225,883 B1 * | 5/2001 | Wellner et al. ............ 200/400 |
| 6,307,453 B1 * | 10/2001 | Wellner et al. ............ 335/172 |

* cited by examiner

*Primary Examiner*—Bao Q. Vu
(74) *Attorney, Agent, or Firm*—Martin J. Moran (57) ABSTRACT

Arc faults in ac electric power systems including aircraft 400 Hz and other such ac electrical systems are detected by an arc fault detector generating a time attenuated cumulative sum of amounts by which the current in each most recent cyclic interval of current, preferably each half cycle, exceeds the magnitude of the current in the immediately preceding cyclic interval in absolute magnitude after a first cyclic interval in which the current exceeds a selected arming magnitude. Preferably, the magnitude detected by a peak detector is used, but alternatively differences in the average magnitude or the rms magnitude between half cycles can be accumulated. When the cumulative sum reaches a preset value, an arc fault indication is generated. The time cumulative sum is cleared if it decreases to a preset value and the selected arming current must be exceeded again to reinitiate generation of the time attenuated cumulative sum.

26 Claims, 7 Drawing Sheets

ARC FAULT DETECTION IN AC ELECTRIC POWER SYSTEMS

BACKGROUND OF THE INVENTION

1. Field of the Invention

This invention relates to a method and a detector for detecting arc faults and to circuit breakers incorporating such an arc fault detector and utilizing such a method. In particular, it relates to detecting arc faults in ac electrical power systems including aircraft and other ac electrical power systems which operate at a higher frequency such as 400 Hz than the 50 or 60 Hz of the typical electric power distribution system.

2. Background Information

Recent attention to the wiring problems associated with "aging aircraft" has highlighted the deficiencies of the circuit protective devices designed to limit the wire damage and fire hazard associated with an electrical fault on an aircraft. The protection device most commonly used consists of an overload responsive trip mechanism such as a RMS current responsive bimetal. The bimetal has a resistance which dissipates energy in the form of heat at a rate which is a function of this resistance multiplied by the RMS current squared causing it to deflect. At a certain deflection, a spring powered operating mechanism is unlatched causing the circuit interrupters' current carrying contacts to separate. This opens or deenergizes the circuit and causes the fault current to cease. The spring is recharged and latched by resetting the circuit interrupter. This type of overload protection does an excellent job of protecting wires and their insulation from degradation and damage due to a current induced over-temperature condition.

Aircraft circuit breakers typically employ only overload protection. While overcurrent protection in the form of an instantaneous trip function at a given value of load current is possible, such protection is normally not provided on aircraft circuit breakers because of concern that such protection can be susceptible to unwanted or nuisance tripping.

Figure 1:
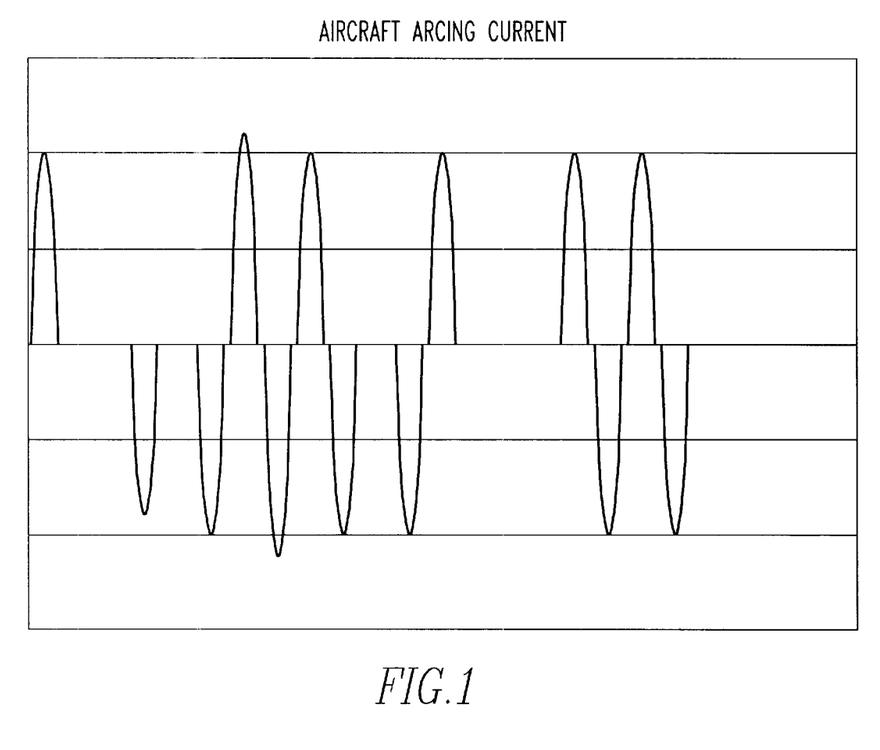
FIG. 1 illustrates the current waveform of an arc in an aircraft ac electrical circuit.

A fault current that flows between a conductor and a neutral or ground conductor when an arcing condition develops due to an insulation failure or breakdown is not continuous but is intermittent or sputtering in nature. An example of a waveform of such an arc fault is show in FIG. 1. The arc voltage of about 30 to 60 volts opposes the instantaneous line value. This results in four characteristics that help define the arcing current waveform. First, the arc current is zero for a period each half cycle before the arc can be restruck after a current zero. Second, the arc may not restrike at all or only after a long delay so that there are missing half cycles. Third, the resulting peak current is reduced below that which would flow if a "bolted" fault occurred at the same point in the electrical system. And finally, fourth, the current each half cycle will go to zero before voltage zero. These four characteristics are evident in the arc current waveform shown in FIG. 1. The intermittent nature of the current waveform reduces the RMS or bimetal-heating value below that required to trip the typical aircraft circuit breaker.

In order to develop a technique for detecting dangerous arc faults, the characteristic waveform or signature of safe current waveforms that exist on an aircraft must be analyzed so that the arc fault can be reliably distinguished from a safe current. The two most common loads on an aircraft are electronic and motor.

Figure 2:
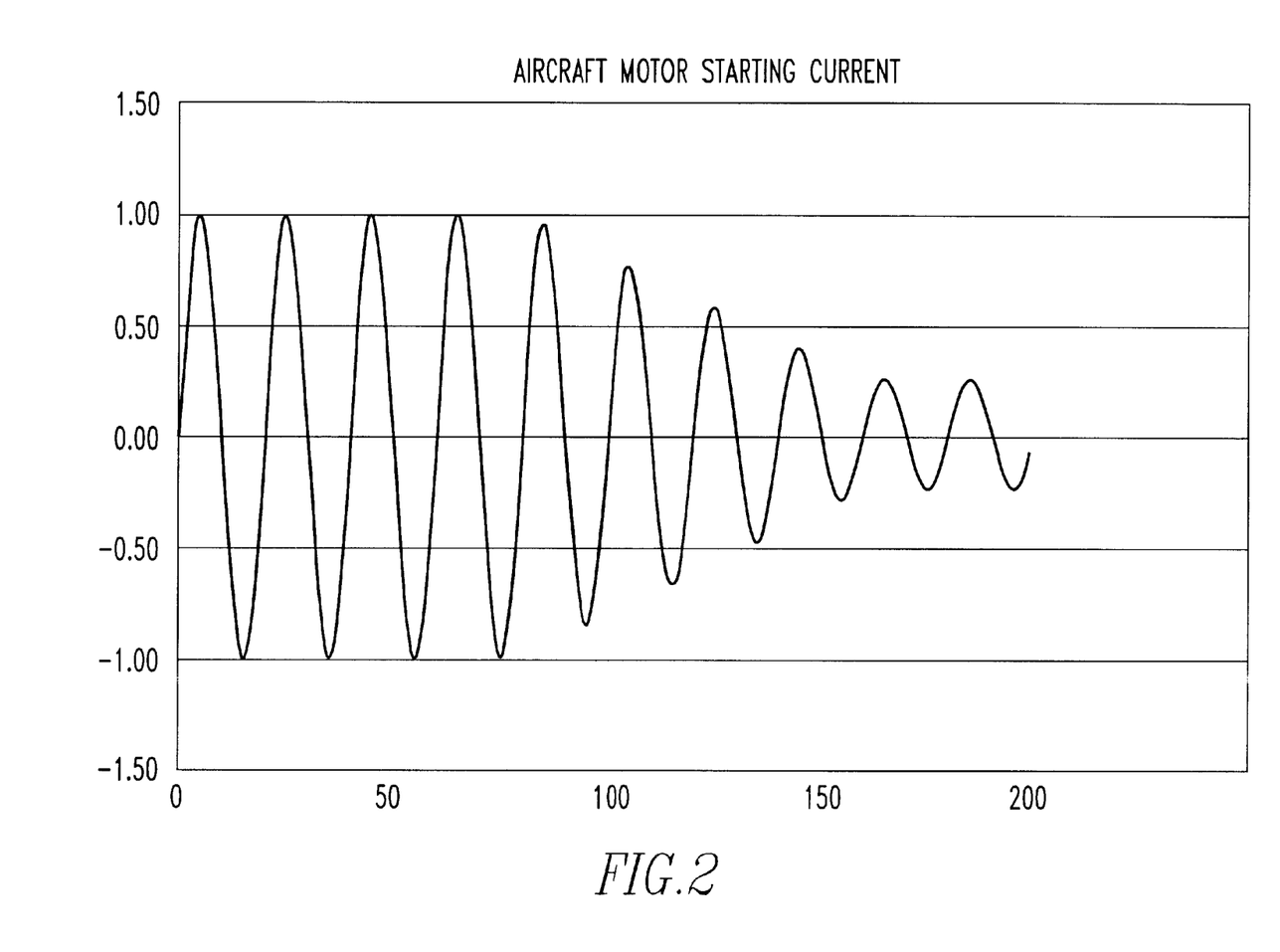
FIG. 2 illustrates the starting current waveform of a typical motor load in an aircraft ac electrical circuit.

The starting current of a typical motor is shown in FIG. 2. As can be seen, the current does not exhibit the zero current crossing characteristics of an arcing current. The current tends to be high during the starting period and then decays to a smaller value as the motor reaches normal operating speed.

Figure 3:
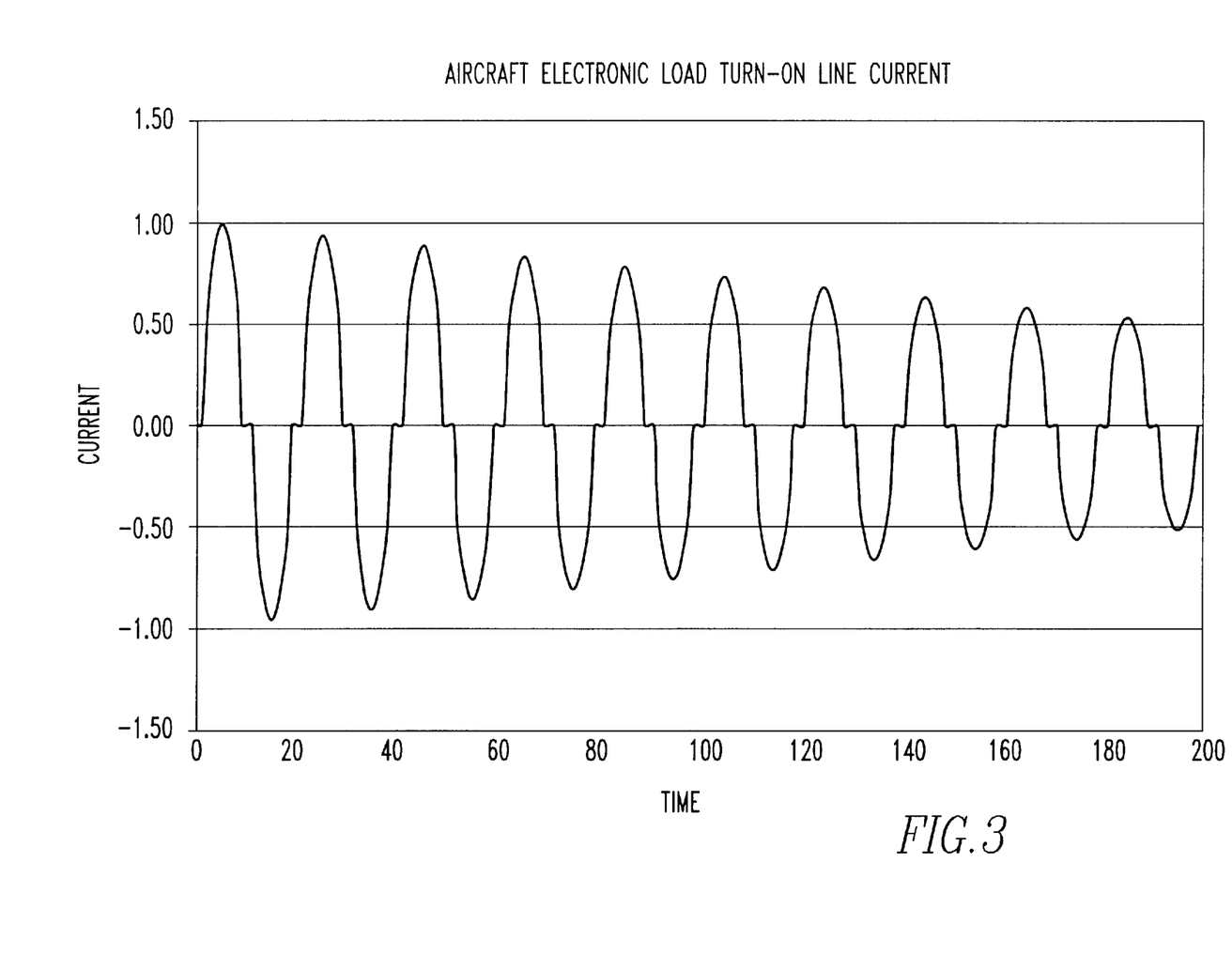
FIG. 3 illustrates the in-rush current waveform of a typical electronic load in an aircraft ac electrical circuit.

The normal in-rush charging current that exists when an electronic load is energized exhibits two of the four characteristics of a dangerous arcing current as can be seen in FIG. 3. Typically, the electronic load has a power supply which consists of a simple full wave current rectifier followed by a dc storage capacitor. The capacitor voltage opposes the source voltage each half cycle just as the arc voltage does, and thus the period of zero current around current zero crossing is the same for each waveform. The amplitude of the arcing current can be greater or less than the in-rush current, and thus the peak value of current can only be used to protect against very high arcing currents. Compared to an arcing current, the electronic in-rush current has no missing half cycles and decays each half cycle.

Other aircraft loads consist of resistive types like heaters and incandescent lamps, inductive loads such as florescent lamp ballasts, and possibly ac capacitive input loads. All of these loads have a zero current crossing much like that for the motor load, hence there is no period of zero current. Both the inductive and capacitive loads have a very large transient initial peak half cycle of current.

Much attention has been directed toward arc fault protection in residential electric power distribution systems. Generally, one of two techniques is employed. In the first, the high frequency characteristics of arc fault waveforms are exploited. These arc fault detectors look at such characteristics as the high frequency noise, the presence of zero current and missing half cycles. The second approach looks for the step increases in current resulting when an arc is struck. The arc fault detector disclosed in U.S. Pat. No. 5,691,869 utilizes a bandpass filter to generate a pulse having an amplitude which is a function of the magnitude of the step increase in voltage caused by striking of the arc. The magnitude of these pulses, or at least a portion above a selected threshold, is accumulated. When the accumulated value reaches a certain level, an arc fault indication is generated. The accumulated value is time attenuated so that pulses must occur with sufficient frequency and magnitude to reach the selected level.

The characteristics of aircraft electrical systems do not make it possible to employ the arc fault circuit breakers developed for residential electric power distribution systems. First, aircraft ac systems typically operate at 400 Hz as opposed to the 50 or 60 Hz of residential power systems. At 400 Hz, the quiescent periods in the arc current are much shorter. In addition, the waveforms are much steeper and therefore it is more difficult to distinguish the normal current rise from the step increases caused by an arc. Most importantly, aircraft electrical systems utilize small gauge wires which can be very long and therefore have substantial resistance. As a result, a load close to the generator can draw a normal current that far exceeds a fault current on a remote part of the wiring. More importantly, a fault current may draw a couple of thousand amps if close to the generator but only perhaps 30 or 40 amps if in a remote section of the wiring. Thus, it is not practical to rely on the magnitude of current in an aircraft electrical system to distinguish an arc fault.

There is a need therefore for an improved arc fault detector and method of arc detection for ac electrical power systems including aircraft ac electrical systems and other electrical systems operating at frequencies above the conventional 50 to 60 Hz and typically in the range of 400 Hz.

SUMMARY OF THE INVENTION

This need and others are satisfied by the invention which is directed to an arc fault detector for ac electrical power systems in general and is particularly suitable for an aircraft ac electrical system or other ac systems operating at higher frequencies such as 400 Hz. The arc fault detector of the invention includes a current detector detecting the ac current flowing in the electrical circuit, and a processor which generates a cumulative sum of amounts by which the ac current in each most recent cyclic interval exceeds the current in the immediately preceding half cycle in absolute magnitude. An arc fault indication is generated when this cumulative sum reaches a selected level. Preferably, the cumulative sum is time attenuated and the arc indication is generated when the time attenuated cumulative sum reaches a selected level. The current magnitude which is monitored can be the average magnitude or the RMS magnitude but is preferably the peak magnitude. The processor only adds the calculated differential to the time attenuated cumulative sum for cyclic intervals in which the current exceeds that for the immediately preceding cyclic interval in absolute magnitude by a selected amount after a first cyclic interval in which the current exceeds a selected arming magnitude. Hence, it takes a cyclic interval with current of a magnitude above the selected magnitude to arm the system. The processor terminates adding to the attenuated cumulative sum when the sum attenuates to a predetermined minimum level. At this point, the system is disarmed and the cumulative sum is cleared. In a preferred embodiment of the invention, the cyclic intervals comprise half cycles of the ac current.

The current detector includes a rectifier and a peak detector generating the peak value of each half cycle of the rectified current.

The arc fault detector can also include a delayed trip. Where the arc occurs every half cycle, and the peaks have similar magnitude, it may take a long time to accumulate sufficient differentials from cycle to cycle to reach the trip level. Accordingly, as another aspect of the invention, a short delay function is provided by short delay means which accumulate a time attenuated short delay accumulation of peak values of current for cyclic intervals (e.g., half cycles) in which the peak current is above a short delay threshold.

The invention also embraces a circuit breaker incorporating the above described arc fault detector. It further includes a method of arc fault detection which comprises the steps of: monitoring the magnitude of half cycles of the ac current, comparing this magnitude to a selected magnitude, for each half cycle exceeding the selected magnitude after a first half cycle exceeding that magnitude generating a cumulative sum of differences by which the magnitude exceeds the magnitude of an immediately preceding half cycle. The method further includes reducing the cumulative sum by a selected function of time and generating an arc fault indication when the cumulative sum reaches a preset value. In addition, the method includes clearing the cumulative sum when it attenuates to a selected minimum value. The method can also include generating a delayed trip as a time attenuated accumulation of peak values which exceed a threshold value.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to an aircraft circuit breaker for an ac electrical system operating at 400 Hz. It will be appreciated however, that the invention has application in other ac electrical systems operating at similar frequencies and in other ac electrical systems operating at other frequencies.

Figure 4:
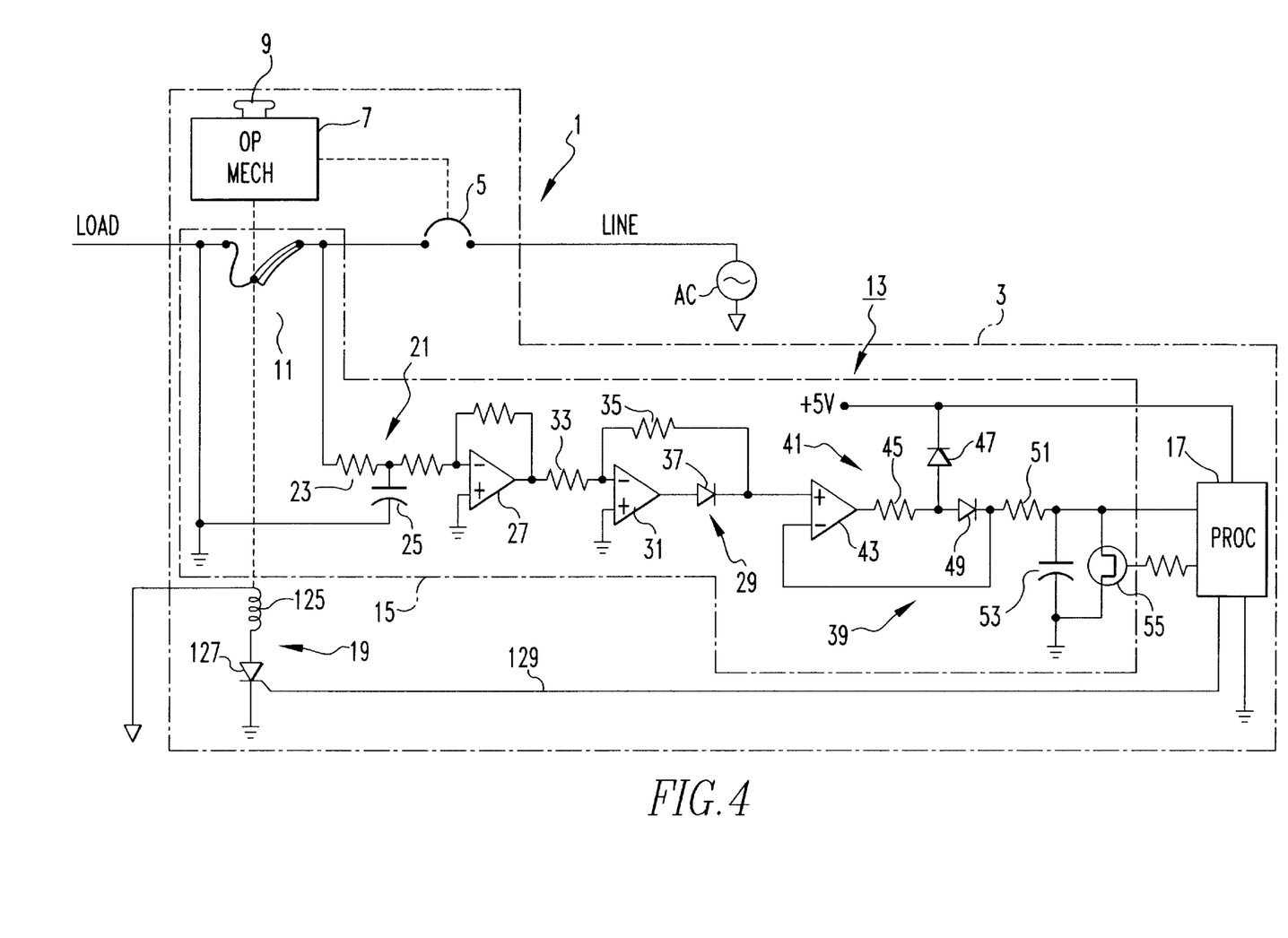
FIG. 4 is a schematic circuit diagram of an aircraft arc fault circuit breaker incorporating the invention.

FIG. 4 illustrates an aircraft electric circuit 1 protected by a circuit breaker 3 incorporating the invention. This circuit breaker 3 includes separable contacts 5 connected in series with the aircraft electric circuit 1. The separable contacts 5 are opened and closed by an operating mechanism 7. This action is effected manually by a handle 9 on the operating mechanism. In addition, the separable contacts 5 are opened automatically by a bimetal 11 which responds to a persistent overcurrent in the aircraft electric circuit 1.

As discussed above, an arc fault typically does not generate an average current sufficient to produce a response by the bimetal 11. Thus, in accordance with the invention, an arc fault detector 13 provides protection from arc faults. This arc fault detector 13 includes a current detector 15, a processor 17 and an output circuit 19. Current in the aircraft electric circuit 1 is sensed by detecting the voltage drop across the known resistance of the bimetal 11 as is taught in U.S. Pat. No. 5,519,561. The sensed current is filtered by a low pass filter 21 comprising the series resistor 23 and shunt capacitor 25 to remove high frequency noise and spikes in the current. This low pass filter 21 has a roll off frequency typically in the range of about 40–50 KHz. Hence, the filter 21 passes the fundamental 400 Hz of the current. The filtered sensed current is amplified by an op amp 27 and applied to a full wave rectifier 29 which includes op amp 31, input resistor 33, feedback resistor 35 and a diode 37 at the output of the op amp. The filtered sensed current signal is applied to the inverting input of the op amp 31 so that negative half cycles become positive half cycles at the output of the op amp and are passed by the diode 37. Positive half cycles of the sensed current become negative half cycles which are blocked by the diode 37. However, these positive half cycles are passed directly through the resistors 33 and 35 without appreciable attenuation as the op amp of the next stage has a very high input resistance. The values of the resistors 33 and 35 are made equal so that a gain of one is applied to the negative half cycles also.

The filtered and rectified half cycles of current are applied to a peak detector 39 which incorporates a clamping circuit 41 so that the magnitude of the half cycles does not exceed the input capability of the processor 17. This clamping circuit includes an op amp 43, a resistor 45 and a diode 47 tied to the plus five volt supply.

The peak detector also includes the diode 49, resistor 51, capacitor 53 and the FET 55 shunting the capacitor 53. The capacitor 53 charges up to the peak magnitude of the pulses with a charging current limited by the resistor 51. The diode 49 prevents the capacitor 53 from discharging as the amplitude of the pulse decreases thereby holding the peak value on the capacitor 53. This diode 49 also compensates for the forward drop of the diode 47 so that this peak magnitude generated on the capacitor 53 does not exceed the plus five volts of the supply voltage. The resistor 45 provides stability for the clamping circuit. The voltage across the capacitor is read during each half cycle by the processor 17. The processor then turns on the FET 55 to discharge the capacitor 53 for sampling the next half cycle.

The processor 17 analyzes the peak magnitudes of the successive half cycles of current to detect the presence of an arc fault. As the magnitude of the arc current in an aircraft electrical circuit can be dependent upon its distance from the source, the processor 17 looks for differences in the peak magnitude between half cycles. The difference by which each most recent half cycle of current, above a selected magnitude, exceeds its immediately preceding half cycle in absolute magnitude is added to a cumulative sum. The processor 17 only adds the calculated differential to the time attenuated cumulative sum for half cycles above the selected magnitude which exceed the immediately preceding half cycle in absolute magnitude after a first half cycle which exceeds this selected magnitude. Therefore, it takes a first half cycle with a magnitude above the selected magnitude to arm the system. The processor also attenuates the cumulative sum as a function of time by reducing the sum each half cycle to thereby produce a time attenuated cumulative sum. The processor 17 terminates adding to the attenuated cumulative sum when this sum attenuates to a predetermined minimum level. As an arc fault can be intermittent, in that it does not strike every half cycle, a missing half cycle produces a large difference in magnitude compared to the next half cycle in which an arc strikes so that the cumulative sum can rapidly build to the trip level under such conditions.

The processor 17 also provides a delayed trip for those instances where an arc strikes regularly each half cycle. The differences in magnitude between half cycles can be very small in such case and would require an inordinate number of cycles before a trip signal could be generated. The delayed trip is generated if a time attenuated accumulation of peak values of current above a short delay threshold exceed a short delay trip value.

Figure 5A:
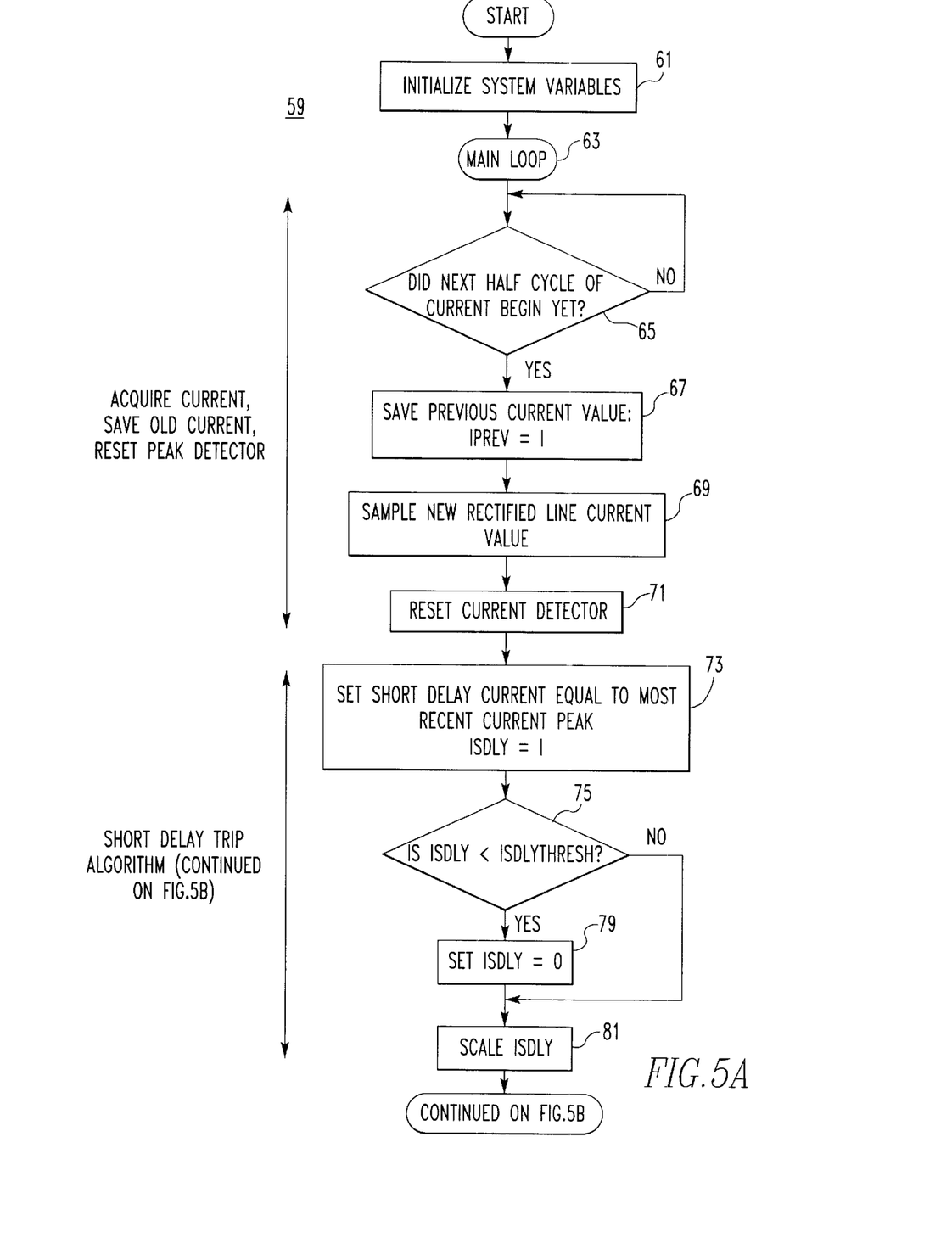
FIGS. 5A–5C illustrate a flow chart of an algorithm implemented by the arc fault circuit breaker of FIG. 4.
Figure 5B:
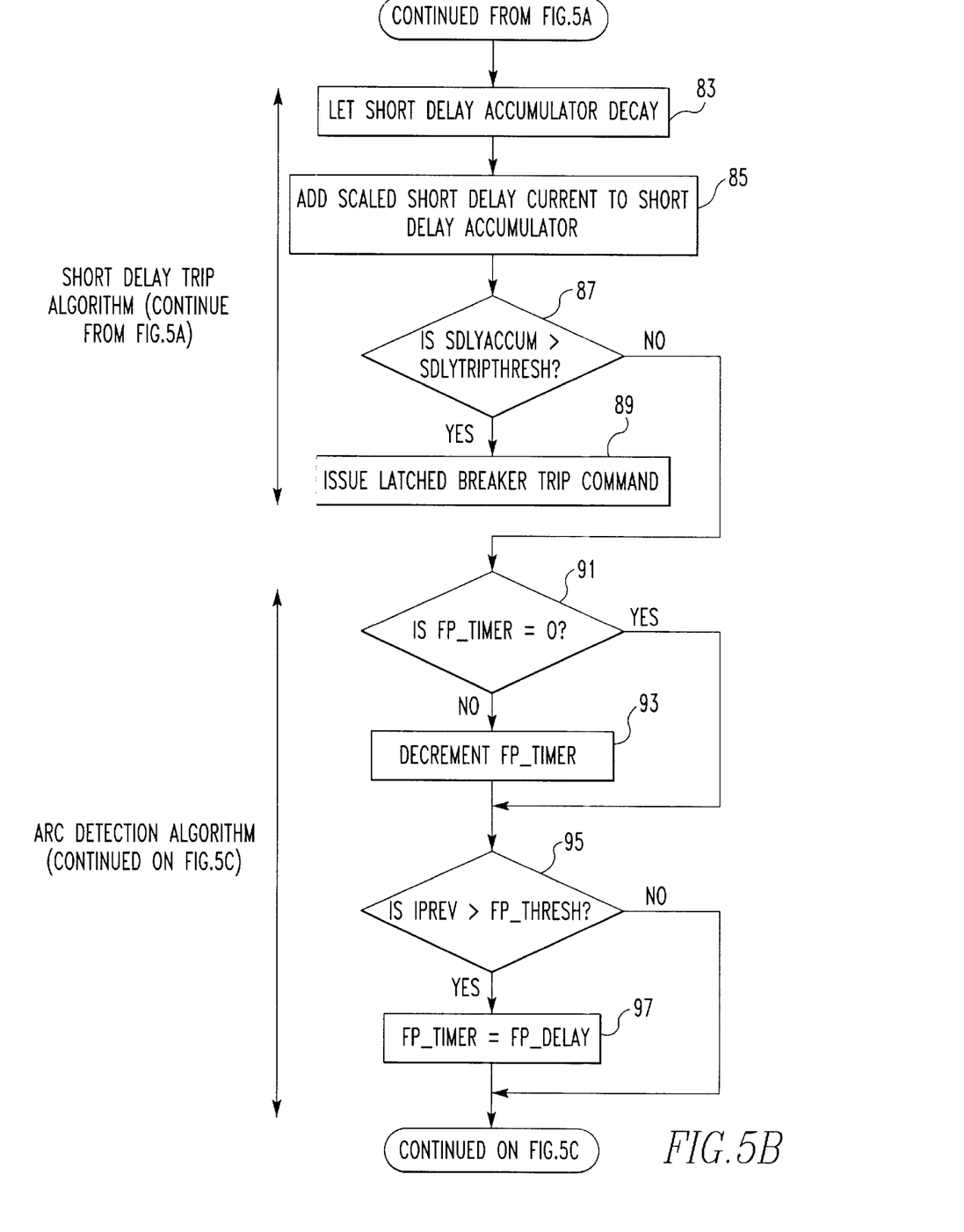
Figure 5C:
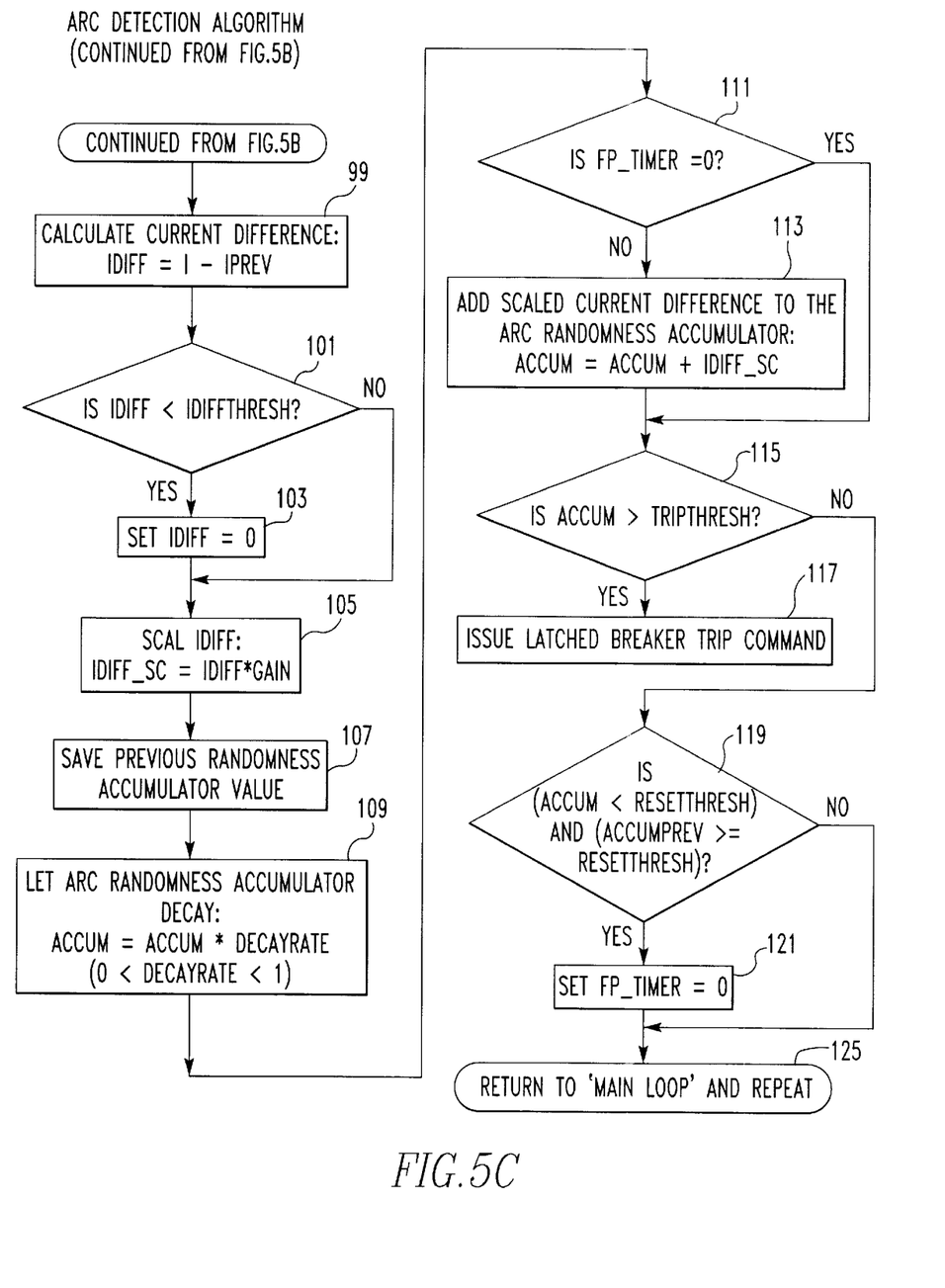

FIGS. 5A–5C illustrate a flow chart 59 of the algorithm used by the processor 17 to implement the invention. Upon start up, the processor initializes system variables at 61 and then enters a main loop at 63. For each half cycle as determined at 65, the previous current value is saved at 67 before the peak value stored on the peak detector is sampled at 69. The FET 55 is then turned on at 71 to reset the peak detector. Next, the short delay function is initiated by setting the short delay current equal to the most recent current peak at 73. If this value does not exceed the threshold for the short delay as determined at 75, the short delay current and short delay accumulator are set to zero at 79. If the short delay current exceeds the threshold it is scaled at 81. Turning to FIG. 5B, the short delay accumulator is decayed at 83 and then the scaled short delay current value is added to the short delay accumulator at 85. If the short delay accumulator value exceeds the threshold at 87, a breaker trip command is generated at 89.

If no short delay trip command is generated, the arc detection function is implemented. The first half cycle or pulse to exceed the arc threshold is not used in order to discriminate from the large inrush currents which can be generated by some loads. This first half cycle is ignored by using a first pulse (FP) counter. If this timer goes to zero, the next increase in current that is greater than the minimum increase threshold is not integrated. Returning to FIG. 5B, the first pulse timer is not zero at 91 it is decremented at 93. If the magnitude of the previous pulse is more than the first pulse threshold as determined at 95, the first pulse timer is set to a maximum interval at 97.

Turning to FIG. 5C, the difference between the magnitude of the most recent pulse and the succeeding pulse is determined at 99. If this difference is less than a minimum difference threshold as determined at 101, the difference is set to zero at 103. Otherwise, the difference value is scaled at 105. As part of the function of dearming the arc detector when the time attenuated cumulative sum decays to a minimum value, the previous value of the accumulator in which the cumulative sum is stored is saved at 107. The cumulative sum is then decayed at 109. If the first pulse timer has not reached zero, indicating that this is not a first pulse above the first pulse threshold as determined at 111, the scaled current difference is added to the cumulative sum at 113. If the cumulative sum exceeds the trip threshold as determined at 115, a trip command is generated at 117. Next, if the cumulative sum has decayed below a reset threshold but the previous value of the cumulative sum was above the preset threshold as determined at 119, the first pulse timer is reset to zero at 121. In either case, the algorithm returns at 123 to the beginning of the main loop at 63 in FIG. 5A.

Returning to FIG. 4, the trip command generated by the processor 17 either upon detection of an arc fault or through the generation of the delayed trip, is applied to the output circuit 19. This output circuit includes a trip coil 125 which is energized from the load side of the separable contacts 5 in the circuit breaker and load ground and is controlled by a silicon controlled rectifier (SCR) 127 triggered by the trip command provided by the processor over the lead 129. The trip solenoid 125 when energized actuates the operating mechanism 7 to open the separable contacts 5.

While the preferred form of the processor 17 is a digital processor which is now available in a physical size suitable for incorporation into the subminiature circuit breakers used in aircraft electrical circuits, analog circuitry could alternatively be utilized. It can also be appreciated from the above that the method of detecting arc faults in a 400 Hz ac electrical system such as an aircraft electrical system comprises the steps of monitoring the magnitude of the half cycles of current in the ac electrical system. The magnitude of each half cycle is compared to a selected magnitude. For those half cycles exceeding the selected magnitude after a first half cycle exceeding the selected magnitude, a cumulative sum of the differences by which the magnitude exceeds the magnitude of an immediately preceding half cycle is generated. This cumulative sum is reduced by a selected function of time. Should the cumulative sum reach a selected value, an arc fault indication is generated.

While the exemplary system described uses measurements of current in each half cycle of the ac current, other cyclic intervals, such as once each cycle or multiple cycles could be used instead.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An arc fault detector for an ac electric power system comprising:

a current detector detecting ac current flowing in said ac electric power system;

a processor for generating a cumulative sum of amounts by which the magnitude of current in each most recent cyclic interval of current exceeds the magnitude of current in the immediately preceding cyclic interval in absolute magnitude; and an output generator generating an arc indication when said cumulative sum reaches a selected level.

2. The arc fault detector of claim 1 wherein said magnitude is proportional to one of peak magnitude, average magnitude, and rms magnitude.

3. The arc fault detector of claim 2 wherein said magnitude is proportional to peak magnitude.

4. The arc fault detector of claim 1 wherein said processor only adds to said cumulative sum for cyclic intervals in which the magnitude of the current exceeds the current in the immediately preceding cyclic interval in absolute magnitude after a first cyclic interval in which the current exceeds an arming magnitude.

5. The arc fault detector of claim 4 wherein said current detector comprises a rectifier rectifying said ac current to produce a rectified ac current.

6. The arc fault detector of claim 5 wherein said current detector further includes a peak detector generating the peak value for each cyclic interval of said rectified current.

7. The arc fault detector of claim 5 wherein said cyclic intervals comprise half cycles of said ac current and said rectifier is a full wave rectifier.

8. The arc fault detector of claim 6 wherein said processor comprises means comparing said peak value of the current in a second and subsequent cyclic intervals to the immediately preceding cyclic interval, means adding to said cumulative sum the amount by which the peak values of current in said second and subsequent cyclic intervals exceed the peak values of current in the immediately preceding cyclic interval, and means reducing said cumulative sum by a selected function of time to produce a time attenuated cumulative sum, said output generator generating said arc indication when said time attenuated cumulative sum reaches said selected level.

9. The arc fault detector of claim 8 wherein said processor includes means terminating adding to said time attenuated cumulative sum when said time attenuated cumulative sum attenuates to a predetermined level.

10. The arc fault detector of claim 1 wherein said processor includes short delay means accumulating a time attenuated short delay accumulation of peak values of current for cyclic intervals in which said peak current is above a short delay threshold and generating an arc indication if the time attenuated short delay reaches a short delay value.

11. The arc fault detector of claim 10 wherein said cyclic interval comprises a half cycle of said ac current.

12. The arc fault detector of claim 1 wherein said processor also includes means starting a timing interval when said peak value of current exceeds a certain threshold and generates an arc indication if said peak value of current remains above said certain threshold for each cyclic interval during said timing interval.

13. The arc fault detector of claim 1 wherein said processor includes means attenuating said cumulative sum as a function of time to produce a time attenuated cumulative sum, and said output generator generates said arc indication when said time attenuated cumulative sum reaches said selected value.

14. The arc fault detector of claim 13 wherein said processor only adds to said time attenuated cumulative sum for cyclic intervals in which the magnitude of the current exceeds the magnitude of the current in the immediately preceding cyclic interval in absolute magnitude by a selected amount after a first cyclic interval in which the current exceeds an arming magnitude.

15. The arc fault detector of claim 14 wherein said magnitude is one of peak magnitude, average magnitude, and rms magnitude.

16. The arc fault detector of claim 15 wherein said magnitude is peak magnitude.

17. The arc fault detector of claim 16 wherein said cyclic interval comprises a half cycle.

18. The arc fault detector of claim 1 wherein said cyclic interval comprises a half cycle.

19. An arc fault circuit breaker for a 400 Hz ac electrical system comprising:

separable contacts;

an operating mechanism opening said separable contacts in response to a trip signal; and a trip unit including an arc fault detector comprising:
a current detector detecting ac current flowing in said ac electrical system;
a processor for generating a time attenuated cumulative sum of amounts by which each most recent cyclic interval of current exceeds its immediately preceding cyclic interval in absolute magnitude;
a trip signal generator generating a trip signal when said time attenuated cumulative sum reaches a selected level.

20. The arc fault circuit breaker of claim 19 wherein said cyclic interval comprises a half cycle of said ac current.

21. The arc fault circuit breaker of claim 20 wherein said processor includes means reducing said time attenuated cumulative sum by a selected amount each half cycle.

22. The arc fault circuit breaker of claim 21 wherein said processor further includes means terminating adding to said time attenuated cumulative sum when said time attenuated cumulative sum attenuates to a predetermined level.

23. The arc fault circuit breaker of claim 20 wherein said processor only adds to said time attenuated cumulative sum for half cycles in which the magnitude of the ac current exceeds the magnitude of the ac current in the immediately preceding half cycle in absolute magnitude after a first half cycle in which the magnitude of the ac current exceeds an arming magnitude.

24. A method of detecting arc faults in an ac electrical system comprising the steps of:

monitoring the magnitude of current during cyclic intervals of said ac current;

comparing said magnitude to a selected magnitude;

for each cyclic interval after a first cyclic interval in which the magnitude of the current exceeds said selected magnitude, generating a cumulative sum of differences by which said magnitude exceeds the magnitude of an immediately preceding cyclic interval;

reducing said cumulative sum by a selected function of time;

generating an arc fault indication when said cumulative sum reaches a selected value.

25. The method of claim 24 in wherein said ac electrical system is a 400 Hz ac electrical system.

26. The method of claim 25 in wherein said cyclic interval comprises a half cycle of said current.

* * * * *